US008239299B2

(12) United States Patent
Dong et al.

(10) Patent No.: US 8,239,299 B2
(45) Date of Patent: Aug. 7, 2012

(54) TYPE-DRIVEN RULES FOR FINANCIAL INTELLEGENCE

(75) Inventors: Randy Dong, Issaquah, WA (US); Lewis C. Levin, Redmond, WA (US); Rou-Peng Huang, Redmond, WA (US); Peiyuan Yan, Redmond, WA (US); Xiaohong Yang, Sammamish, WA (US); Peter Bull, Redmond, WA (US); Scott Sebelsky, Camano Island, WA (US)

(73) Assignee: Microsoft Corporation, Redmond, WA (US)

( * ) Notice: Subject to any disclaimer, the term of this patent is extended or adjusted under 35 U.S.C. 154(b) by 691 days.

(21) Appl. No.: 11/710,702

(22) Filed: Feb. 26, 2007

(65) Prior Publication Data

US 2008/0208720 A1 Aug. 28, 2008

(51) Int. Cl.
*G06Q 40/00* (2006.01)

(52) U.S. Cl. ............... 705/35; 705/36; 705/37; 705/38; 705/39

(58) Field of Classification Search ............ 705/35, 705/36 R, 37, 38, 39, 7, 1
See application file for complete search history.

(56) References Cited

U.S. PATENT DOCUMENTS

| 5,189,608 | A |   | 2/1993  | Lyons et al. |
|-----------|---|---|---------|--------------|
| 5,544,281 | A |   | 8/1996  | Maruoka et al. |
| 5,701,400 | A |   | 12/1997 | Amado |
| 5,893,079 | A | * | 4/1999  | Cwenar ............... 705/36 R |
| 6,041,312 | A | * | 3/2000  | Bickerton et al. ...... 705/36 R |
| 6,513,019 | B2 | * | 1/2003 | Lewis ................... 705/35 |
| 6,581,068 | B1 |   | 6/2003 | Bensoussan et al. |
| 6,671,673 | B1 | * | 12/2003 | Baseman et al. ......... 705/7 |
| 7,310,615 | B2 | * | 12/2007 | Lewis .................. 705/35 |
| 7,502,752 | B1 | * | 3/2009  | Lemons et al. ......... 705/35 |
| 2001/0041995 | A1 | * | 11/2001 | Eder ................. 705/7 |
| 2003/0220860 | A1 | * | 11/2003 | Heytens et al. ......... 705/35 |
| 2004/0073444 | A1 | * | 4/2004  | Peh et al. ............. 705/1 |

(Continued)

FOREIGN PATENT DOCUMENTS

WO 94/20912 A1 9/1994

(Continued)

OTHER PUBLICATIONS

Gregory, Brian, "OFA—Turning your Oracle Financial Data into Business Intelligence", Document Retrieved on Dec. 22, 2006, 6 pages, Document Available at: <http://www.fors.com/eoug97/papers/0235.htm>.

(Continued)

*Primary Examiner* — Nga B. Nguyen

(57) ABSTRACT

Financial intelligence architecture that employs financial types that are combined with rules to build financial behavior into the product. Types have behaviors such that types can be assigned that lead to the physical creation of underlying code which embodies the behaviors. Extensibility is provided at least by type parameterization and new type creation. Because types are a design time experience, types are two-way and can be modified, even after instantiation. This allows for mixing and matching of types and underlying behavior giving the system more flexibility at design time while providing a huge simplification of all the details that actually go into such financial applications. The type library is a set of rules that produce metadata, which metadata is later processed by a separate engine to produce the physical schema. The type library defines the basic interactions, data types, and behaviors for predefined dimensions in the system.

17 Claims, 11 Drawing Sheets

U.S. PATENT DOCUMENTS

| | | | |
|---|---|---|---|
| 2004/0093232 A1 | 5/2004 | Murray | |
| 2005/0004862 A1* | 1/2005 | Kirkland et al. | 705/38 |
| 2005/0182712 A1* | 8/2005 | Angell | 705/39 |
| 2005/0261999 A1 | 11/2005 | Rowady | |
| 2005/0262014 A1 | 11/2005 | Fickes | |
| 2006/0089894 A1 | 4/2006 | Balk et al. | |
| 2006/0178918 A1* | 8/2006 | Mikurak | 705/7 |

FOREIGN PATENT DOCUMENTS

| | | |
|---|---|---|
| WO | 01/50385 A2 | 7/2001 |

OTHER PUBLICATIONS

"SAS® Financial Intelligence, Solutions Lines/Financial Management", Document Retrieved on Dec. 22, 2006, Webpage Available at <http://www.sas.com/solutions/financial/>, 4 pages.

Bergstra, Jan A. et al., "Philosophy of Money and Finance", Philosophy of Finance, Document Retrieved on Dec. 22, 2006, 14 pages, Webpage Available at: <http://www.phil.uu.nl/~janb/phloofin/top.html>.

* cited by examiner

TYPE-DRIVEN RULES FOR FINANCIAL INTELLEGENCE

BACKGROUND

Businesses realize the importance in measuring corporate health using performance indicators. One critical indicator of corporate well-being can be buried in the business financials. Financial intelligence requires significant domain knowledge, and oftentimes the domain knowledge changes. Accordingly, it is no surprise that businesses tend to expend large amounts of money on software/hardware systems and resources to maintain financial systems. However, these systems can include modeling and reporting tools, for example, that are inaccurate or complicated to view data, contributing to financial processes that are misaligned throughout the corporate enterprise.

Vendors offer integrated solutions wherein modules are provided in an attempt to meet the various customer needs for processing financial information. Conventional financial intelligence applications are received from the vendor where the intelligence is hard coded in source code, thereby making it very difficult to augment and change. In support of such rigid regimes changes require the shipping new product components. Integrated tools attempt to address a general need by many customers by providing a patchwork of software modules and add-ons. In other words, these conventional systems fail to provide the flexibility needed for the customer to design and introduce runtime programs for obtaining the information the particular customer needs.

The use of static templates in financial systems data systems is an attempt to provide some measure of flexibility such as a template for a profit/loss statement in a spreadsheet or a template for a consolidation hierarchy for a financial management system, for example. While appearing to be a viable solution, template modification processes can take a significant amount of time. Moreover, oftentimes, the work desired to be achieved is beyond the scope of the template. Thus, the use of templates ends up failing in practice. Customers are left searching for a solution that offers simplicity while making these relatively complex applications with less work and without needing to understand the intricacies of the system itself.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed financial intelligence architecture is a mechanism that provides simplicity while designing relatively complex applications with less work and without the need to understand the intricacies of the system itself. The flexibility designed out of conventional hard-coded systems is returned to the customer by storing rules about financial intelligence separately from the code. This facilitates easier modification that can be made by the vendor and/or third party vendors.

The architecture introduces a set of financial types that are combined with the rules to build financial behavior into the product. Types have behaviors in member properties such that types can be assigned that lead to the physical creation of underlying code that embodies the behaviors. Examples of financial types include an account dimension, entity dimension, and financial model. There are many types, and the types can be extended externally from the source code. A financial types knowledge base can be used to control the user interface interactions as well as the types of financial calculations.

Extensibility can be provided in several ways, via type parameterization and new type creation, for example. Most types are parameterized thereby providing control and flexibility over what the user chooses to do. Additionally, a more technically-oriented developer can add new types that plug into the system. Extensibility can be further enhanced by providing for the creation of member types.

Because types are a design time experience, types are two-way and can be modified, even after instantiation. This allows for mixing and matching of types and underlying behavior giving the system more flexibility at design time while providing simplification of all the details that actually go into such financial and business applications.

Type library rules can be employed that produce metadata which is later processed by a separate engine to produce a physical schema. The type library defines the basic interactions, data types, and behaviors for predefined dimensions in the system. These behaviors can be applied after metadata permission checks have succeeded.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
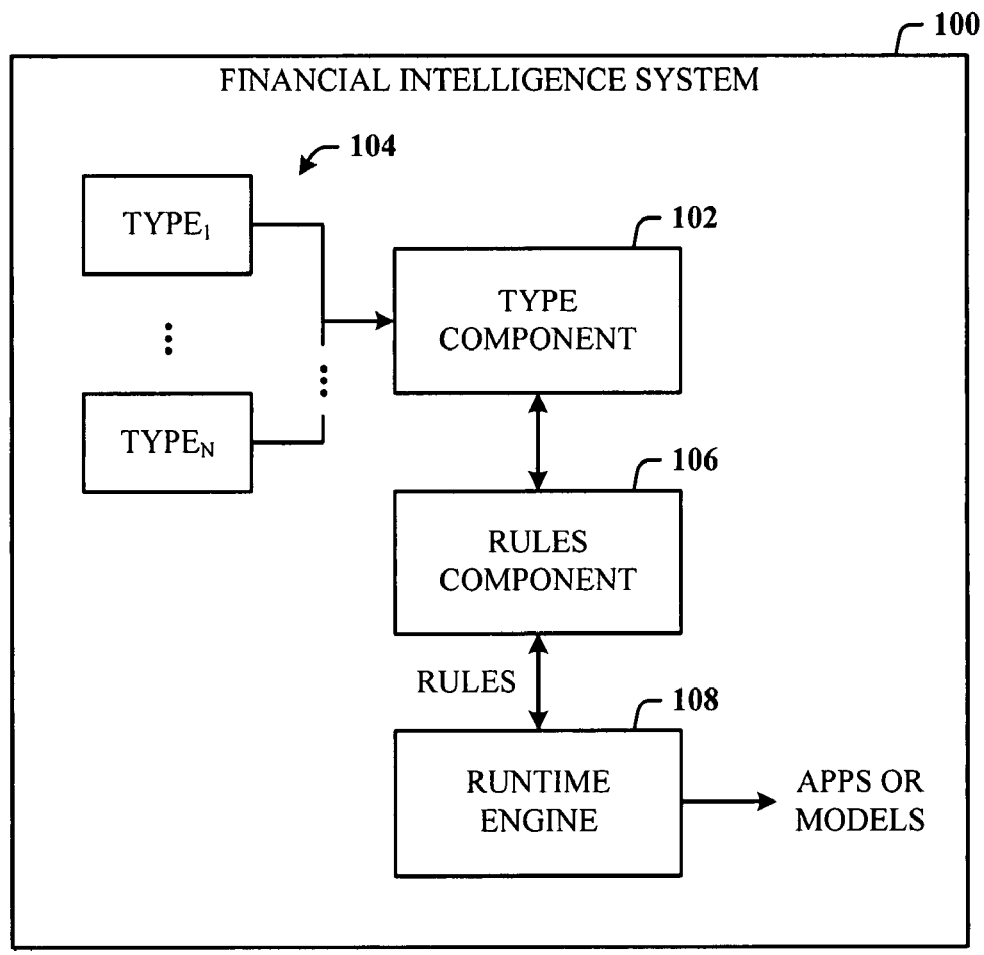
FIG. 1 illustrates a computer-implemented financial intelligence system that facilitates data management.

The disclosed financial intelligence type architecture introduces simplicity in financial intelligence systems by providing a library of rules while dynamically generating the underlying code with the type behaviors and making the system components modifiable after initial instantiation. The types have parameters that can be modified during the design period. Thus, simplified creation of financial applications and extensibility for customization and updates is facilitated thereby eliminating the conventional disadvantages of static templates Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented financial intelligence system 100 that facilitates data management. The system 100 includes a type component 102 for providing and assigning types 104 (denoted $TYPE_1, \ldots, TYPE_N$, where N is a positive integer) to system entities, the types associated with behaviors. A rules component 106 generates rules based on the types 104. A runtime engine 108 then executes the rules to output an application and/or model that employ the behaviors in the underlying code.

Figure 2:
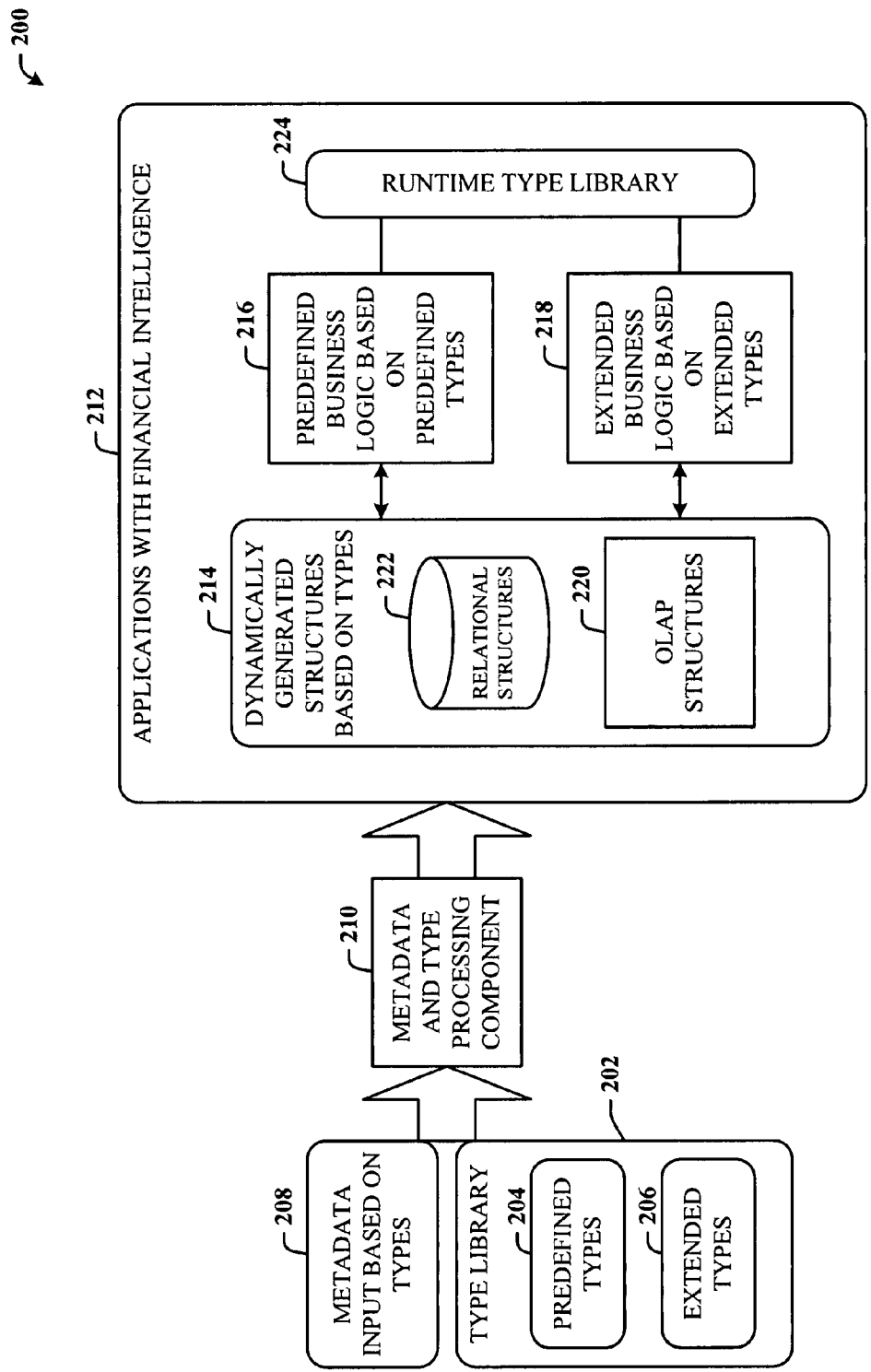
FIG. 2 illustrates a system that shows how a type library and other data enable a more efficient and cost effective financial intelligence application.

FIG. 2 illustrates a system 200 that shows how a type library and other data enable a more efficient and cost effective financial intelligence application. The system 200 input includes a type library 202 which has predefined types 204 and extended types 206, and a metadata input 208 based on the types (204 and 206). The types (204 and 206) and metadata 208 inputs are passed to a metadata and processing component 210 and therefrom, to applications 212 with financial and/or business intelligence. The applications 212 include dynamically generated structures 214 based on the types, predefined business logic 216 based on the predefined types 204 and extended business logic 218 based on the extended types 206. The dynamically generated structures 214 include OLAP (online analytical processing) structures 220 and relational structures 222. The predefined business logic based on the predefined types 216 and extended business logic based on the extended types 218 interact with a runtime type library 224 of the applications 212.

The system 200 illustrates the encoding of financial intelligence (and other types of intelligence) into the type library 202 for aiding users in customizing the application(s) 212. As a result, a customized schema and other structures are generated, as well as code/predefined logic that is type-aware and provides intelligent behaviors. The system 200 shows one embodiment for implementation that employs generic types to drive complex application behavior.

The predefined types 204 and/or extended types 206 encapsulate business and/or financial intelligence. In order to build a customized application with business and/or financial intelligence, business analysts define the application in terms of metadata that is based on these types. Accordingly, business people do not need to have any technical know-how which is typically needed for this type of complex systems. The metadata and type processing component 210 validates the input, and dynamically generates the appropriate structures based on those types (204 and/or 206). The structures can be in relational or OLAP format. Furthermore, the predefined business logic based on pre-defined types 216 and/or extended business logic based on extended types 218 exhibit complex business (or financial) intelligence behaviors for the runtime application. The runtime type library 224 can be used by the business logic components (216 and 218) to avoid any hard-coded type behaviors in the components.

Figure 3:
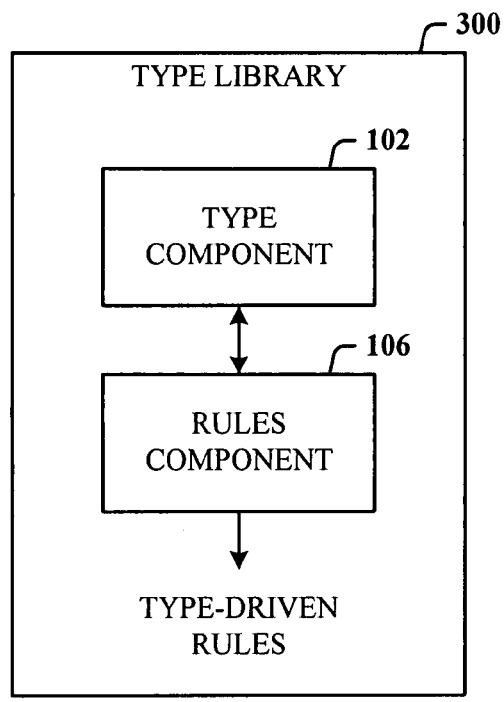
FIG. 3 illustrates an exemplary type library that employs the functionality of the type component and rules component of FIG. 1.

FIG. 3 illustrates an exemplary type library 300 that employs the functionality of the type component 102 and rules component 106 of FIG. 1. The type library 300 can include the type component 102 and rules component 106 for creating types and generating rules based on the types.

Figure 4:
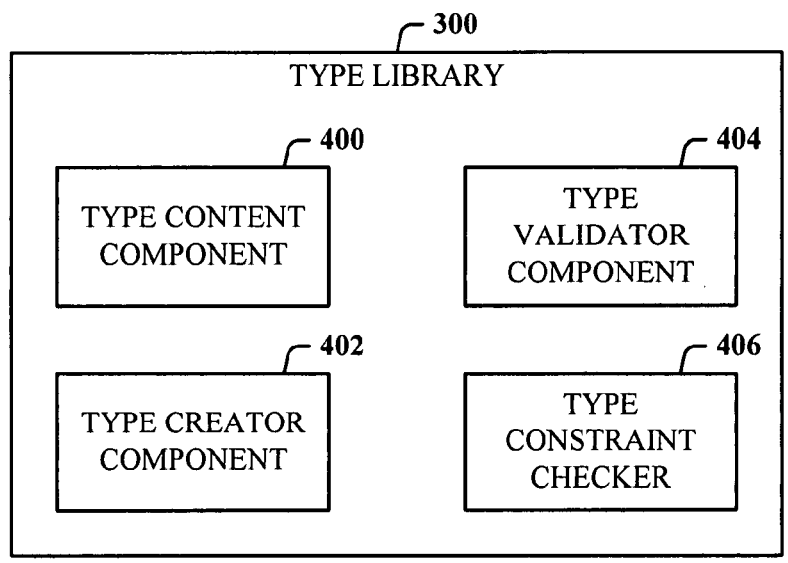
FIG. 4 illustrates one or more engines employed by the type library that interpret and process the type-driven rules.

FIG. 4 illustrates one or more engines employed by the type library 300 that interpret and process the type-driven rules. The type library 300 can be composed of the following main components: a type content component 400, a type creator component 402, a type validator component 404, and optionally, a type constraint checker component 406. The type content component 400 can comprise two types of classes: a BizType class and a TypeLibraryRule class, both of which can be standard business model object classes. This allows the type library content classes to fully leverage a model object infrastructure which provides support for persistence, localization, and serialization.

BizTypes represent a tree of application types where the deeper the traversal down a particular branch, the more specialized the application type. Following is an exemplary section of a full tree:

```
Generic Type
    BizHighLevelEntity
        BizApplicationNode
            Model Site
            Model Subsite
        BizModel
            Generic Model
            Financial Model with Shares
            Financial Model without Shares
```

This shows that a Consolidation Model is a specialized type of BizModel. It also shows that Model Site and Model Subsite are specializations of BizApplicationNode. Both BizModel and BizApplicationNode are specializations of BizHighLevelEntity, and Generic Type is the root of the entire tree. A type that is not part of the tree is called "_NO_TYPE" which represents the situation where there is no type information. This is analogous to NULL in SQL (structured Query Language).

TypeLibraryRules are attached (or owned) by BizType. The attached rules describe the business logic associated with that BizType. TypeLibraryRule is a base class for a collection of sub-classes. The rules are passive, but implement an acyclic visitor pattern which allows for external code to implement their own business logic. In other words, new functions can be added to class hierarchies without affecting those hierarchies and without creating the troublesome dependency cycles inherent to visitors. Both the type creator component 402 and the type validator component 404 can be implemented using this technique.

Figure 5:
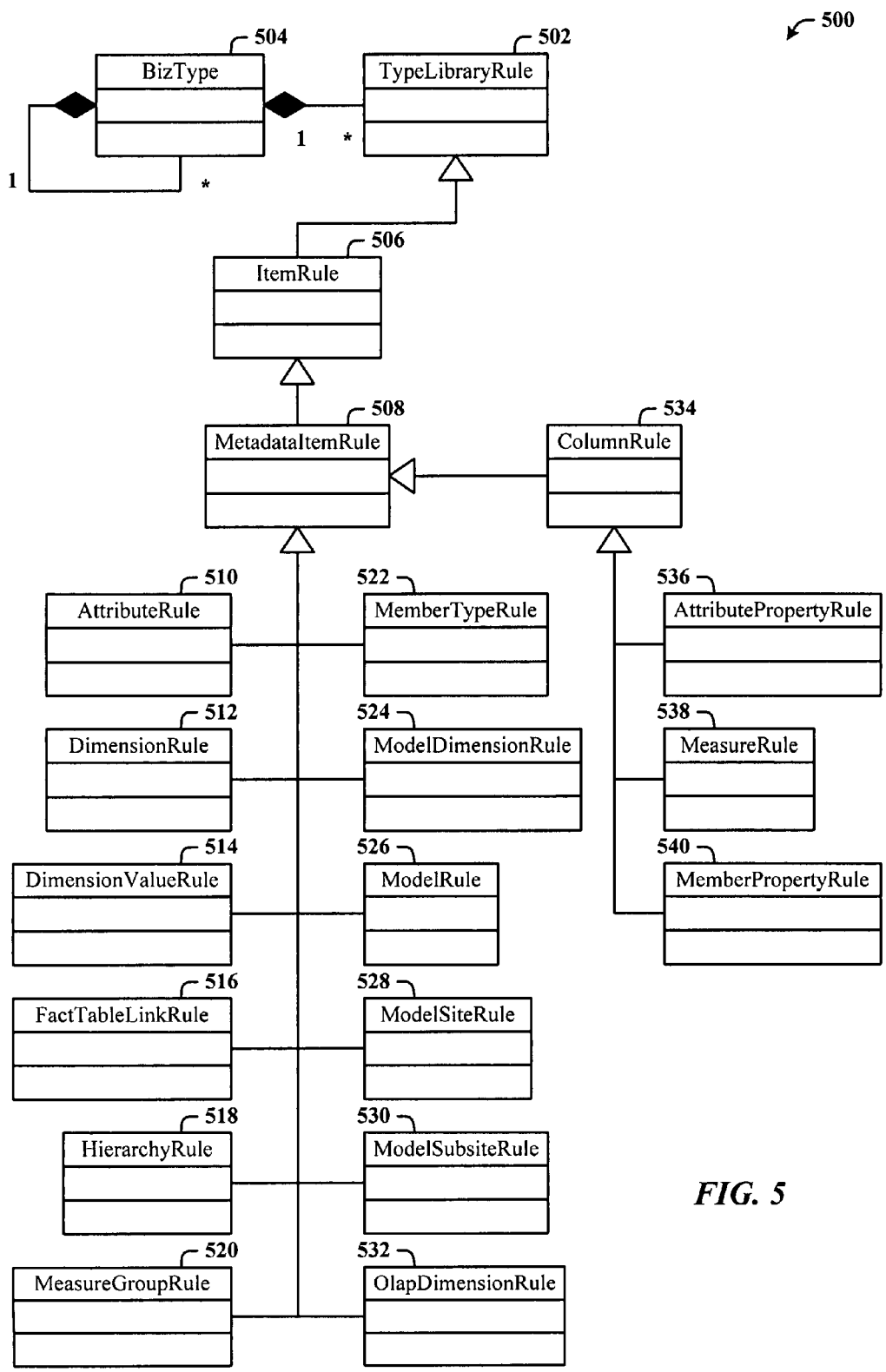
FIG. 5 illustrates a class diagram showing a hierarchy of type library content types.

FIG. 5 illustrates a class diagram 500 showing a hierarchy of type library content types. The hierarchy shows that TypeLibraryRule 502 is attached (or owned) by BizType 504. The class diagram 500 shows content types related to the following: items 506, metadata items 508, attributes 510, dimensions 512, dimension value 514, fact table values 516, hierarchy 518, measure group 520, member type 522, model dimension 524, model rule 526, model site 528, model subsite 530, and OLAP dimension 532. Each metadata item 508 also has a column 534 that further associates attribute properties 536, a measure 538, and a member property 540.

Each rule subclass can have additional properties that allow business logic to function. For example, a Dimension BizType can include rules indicating the Member Properties. This is captured in the MemberPropertyRule 540 (a subclass of TypeLibraryRule 502). One extra property that this rule contains is the BizDataType of the Member Property. The data type indicates the type of the property (e.g., floating point or integer). This information allows the type creator to create a Member Property with the correct data type.

Referring back to FIG. 4, the type library content 400 can be stored in a database, in two tables: BizTypes and BizTypeItems. Rules can be stored in the BizTypeItems table. Client code can obtain the type library content by using a MetadataManager.GetTypeLibraryContent( ) API. This returns an array of all objects in the type library content 400. The type library has a class called TypeLibrary that supports easy caching of this returned array. Following is sample code showing how to call a server for the type library content, and then to cache the content using the TypeLibrary class:

```
// initialize service componment
Stream stream =
typeof(Program).Assembly.GetManifestResourceStream("TypeLibTest.-
ServicesManifest.xml");
ServerManager.Initialize(stream);
MetadataManager mm =
(MetadataManager)ServerManager.Instance.-
GetService(MetadataManagerName);
ServerHandler server =
ServerManager.Instance.GetServerHandler("http://localhost/BizSharp");
server.Connect( );
if (server.SendHeartbeat( ))
{
    Console.WriteLine("SUCCESSFUL TO CONNECT TO SERVER");
}
mm.ServerHandler = server;
Console.WriteLine("You can start to use Metadata Manager now");
// Get the Type Library content by calling the server
MetadataObjectBase[ ] typeLibObjects = mm.GetTypeLibraryContent( );
// Cache the Type Library content by creating and holding on to an
instance of TypeLibrary
TypeLibrary library = new TypeLibrary(typeLibObjects);
```

The TypeLibrary class also exposes additional functionality for common uses. Two methods can be provided for looking up a BizType object either by ID (e.g., a globally unique ID (GUID)) or by name. BizTypes should have a unique name, which can be enforced by a database constraint checker. For convenience, many common BizType ID's can be defined as constants in this class.

Another method exposed by the TypeLibrary class can be a GetAllDescendants method. This method is used to retrieve an entire subtree of the BizType tree. This facilitates callers dynamically building a list of valid types for a given scenario. For example, in PPSPlanningBusinessModeler a user can create a new Model. To do this, PPSPlanningBusinessModeler should call GetAllDescendants for the PPSPlanning-BusinessModeler BizType. This returns the full set of Model types that the Type Library knows how to create. The returned list can be used to populate a dropdown list. Following is sample code:

```
// Initialize the cache with the return value of
GetTypeLibraryContent
TypeLibrary library = new TypeLibrary(typeLibObjects);
// Find the base Model BizType with a lookup by name
BizType modelType = library.GetTypeFromName("BizModel");
// Get the list of Model BizTypes and print them out
List<BizType> allTableTypes = library.GetAllDescendants(modelType,
false);
foreach (BizType tableSubtype in allTableTypes)
    Console.WriteLine(tableSubtype.Name);
```

The second argument to the GetAllDescendants call indicates whether the passed in BizType should be included in the returned descendant collection. The usual value for this parameter will be false; however, this is added for flexibility.

When creating an instance of a BizType, the type creator 402 ensures that the types are concrete (or do not have subtypes). Thereafter, an instance is created and then a process of depth-first traversal is initiated of all rules attached to that BizType. If the rule indicates a subsidiary object needs to be created, then the type creator 402 creates that instance and continues on to that BizType's attached rules. In this way, creating a single BizType results in a full object hierarchy being created.

An example of this process is to create a model. Each model requires at least one measure group. The type creator 402 creates the model from the specific model BizType. One of the rules on the model BizType indicates that a measure group should be created; thus, the type creator 402 will create the measure group as well. Additionally, the measure group has rules indicating the number and names of the measures that also should be created. It should be understood that the aforementioned description is only a subset of the operations that can occur when a model is created.

When loading metadata from a database or metadata that is submitted from a client application (like PPSPlanningBusinessModeler), the type validator component 404 ensures that the metadata is valid. The type validator 404 uses the same set of rules to verify that the metadata is complete and valid. For example, if a model type has a rule that indicates it should have a specific type of measure group, then the type validator 404 will make sure that measure group exists. The type validator 404 performs the same depth-first traversal of rules as the type creator 402, but instead of creating, the type validator performs validations.

When creating an application a set of predefined dimensions can be automatically generated to act as starting points in the application development process. Predefined dimensions serve as templates that can be modified and enhanced. By customizing predefined dimensions, and by adding user-defined dimensions, the dimension structure of the application can be built. When the dimension structure is complete, models can then be created.

Following is a high level overview of one or more predefined dimensions and associated member properties. When creating a new application, the following predefined dimensions can be made immediately available: Exchange Rate, Account, Business Process, Consolidation Method, Currency, Entity, Holding, Intercompany, Flow, Scenario, Time and User. Additionally, when creating a model, a Version dimension can be created that is custom to that model.

The following are the member properties common to all dimensions.

| | |
|---|---|
| Name | The friendly user-facing name for a member of a dimension |
| Label | The unique, user defined, text identifier for a member of a dimension |
| Description | A long text description for a member of a dimension |
| SourceMemberID | This is an optional field that can be used to keep track of the ID of this member in an external source system |

The Account dimension is used to create and maintain a chart of accounts for various financial models. Custom Properties include AccountTypeMemberID, which is used to group accounts into classes such as "Tax" or "Expense" for use with business rules. The remainder of the custom properties are True/False values to control the default behavior of the pre-packaged business rules (such as consolidation and currency translation calculations): Consolidated—this account should be included in the consolidation calculations; Converted—this entity should be included in the currency translation calculations; Intercompany—determines if predefined calculations should access this account for data when performing intercompany calculations; and Unit_Measure provides unit measure costs.

The Business Process dimension is useful for auditing and custom calculations, and contains a staging hierarchy that is used to store the results from predefined financial calculations (e.g., consolidations, allocations, currency translations) for various financial models. In one implementation, no custom properties are included. The following table describes the system-defined dimension members unique to the Business Process dimension.

Predefined members in the Consolidation Method dimension are called Consolidation Method Specs. The following table describes the possible values that a Consolidation Method Spec member can have in the Consolidation Method dimension. For example, the values contain the results of Shares Calculation in a financial model with shares.

A new, user-defined dimension member property can be created for a dimension using a Summary workspace and a Member Maintenance workspace. The new dimension member property will be available to all members of the dimension.

| Consolidation method spec | Description |
|---|---|
| Default | Specifies that the consolidation rule applies to all members |
| Equity | Specifies that the consolidation rule applies to members for which the parent entity has equity control of the member entity |
| Full | Specifies that the consolidation rule applies to members for which the parent entity has full control of the member entity |
| Holding | Specifies that the consolidation applies to a member that is holding company for the parent entity |
| Proportional | Specifies that the consolidation rule applies to investments in a partnership with a defined lifetime term under International Accounting Standards (IAS) |
| NONE | No consolidation method member |

The Currency dimension is used for storing a list of currencies, and is used primarily by an Exchange Rate Global assumption model. This dimension is populated with members before the entity dimension can be edited. In one imple-

| Label | Dimension Member | Description |
|---|---|---|
| CONSOLIDATED | Consolidated value | Aggregation of PREELIM and ELIMINATION: Used to consolidate parent entity accounts for financial models. No input is allowed for this member. |
| ELIMINATION | Elimination | Used for intercompany eliminations and elimination percentages based on the consolidation method. No input is allowed for this member. |
| AUTOADJ | Automatic adjustment | Used for an account during reconciliation. No input is allowed for this member. |
| INPUT | Input | Used for all data input through forms or data loading. Input is allowed for this member. |
| MANADJ | Manual adjustment | Used to update an account manually. Input is in default currency of the entity;. |
| ALLOC | Allocations | Used by allocation rules. Input is allowed for this member only through allocation rules. |
| PREALLOC | Before allocations | Aggregation of INPUT, MANADJ, and AUTOADJ. No input is allowed for this member. |
| POSTALLOC | Post allocated value | Aggregation of ALLOC and PREALLOC. No input is allowed for this member. |
| FXADJ | Currency Manual adjustment | Used to update an account manually. Input is allowed for this member in any currency. In business process dimension. |
| PREELIM | Before Eliminations | Aggregation of POSTALLOC and FXADJ. No input is allowed for this member. |

When including a dimension in a model, the associated rules are automatically included in the model. This applies to all of the exemplary dimensions.

The Consolidation Method dimension is used by a shares model to classify the type of consolidation to perform on a given entity. It is generated with the members shown below.

mentation, the dimension comes pre-populated. The rules associated with the Entity dimension can use the currencies in this dimension to assign currency types to entities. A custom property includes Symbol—a text symbol to use when displaying currency values in reports. Objects that can be added to the currency dimension include dimension members, member sets, member views, and member properties.

The Entity Dimension is used to maintain a list of legal entities for a given financial model. Custom properties include the following: CurrencyMemberID—the reporting currency for this entity—this property can be used by currency translation business rules; EntityTypeMemberID—a classification of the entity for use by the consolidation business rules; Holding; Intercompany—setting this value to "True" creates a copy of this member in the Intercompany dimension. The user cannot directly modify this value, instead, the value is determined by an EntityTypeMemberID according to the mappings defined by an AG_EntityType table in the application database; Scale; Staged; and SupportSharePortfolio.

The Exchange Rate dimension is used by an Exchange Rate Global assumptions model for storing various types of exchange rates. In addition, this dimension can be used by currency translation calculations. Custom properties include ExchangeRateTypeID, which is used to group exchange rates by the type of expected behavior, and Carry Forward, which allows the user to specify if this member should derive its value from the value of another member from a prior period. The Exchange Rate dimension member property ExchangeRateTypeID can have multiple attributes. The attributes specify how the exchange rate is to be calculated. The following table describes one or more possible values for ExchangeRateTypeID.

| Exchange rate type | Label | Description |
| --- | --- | --- |
| Average | AVE | Average exchange rate for the period |
| Budget | BUD | Budget exchange rate for company internal reporting |
| Closing | CLO | Closing exchange rate for the last period |
| Historical | HIST | Historical exchange rate that existed when a transaction occurred, if it differs from the current exchange rate |
| No member | NONE | No exchange rate member. |
| Opening | OPE | The opening exchange rate for the current period |
| Prior Average | PRIORAVE | Prior year average exchange rate that will be used for accounts that have any one of the following Flow types: prior year adjustment, opening, and appropriation |

The Flow dimension consists of a standard set of members used to track cash flows between periods for financial models. When used with the Account and Time dimensions in a model, the Flow dimension automatically performs predefined tasks. For example, at the close of a period, balances are automatically copied from the Flow dimension's CLOSING member into the OPENING member for the following period.

The following table describes flow types and associated flow attributes.

| Flow type | Description | Associated rule properties |
| --- | --- | --- |
| ADD | Addition | Consolidated = TRUE; Converted = TRUE; ReversedSign = FALSE |
| ADJ | Adjustments | Consolidated = TRUE; Converted = TRUE; ReversedSign = FALSE |
| APP | Net income appropriation | Consolidated = TRUE; Converted = TRUE; ReversedSign = FALSE |
| CHGGRP | Changes in group structure | Consolidated = TRUE; Converted = TRUE; ReversedSign = FALSE |
| CHGMETH | Changes in group structure: consolidation method change | Consolidated = TRUE; Converted = TRUE; ReversedSign = FALSE |
| CHGPERCENT | Changes in group structure: percent ownership change | Consolidated = TRUE; Converted = TRUE; ReversedSign = FALSE |
| CLO | Closing balance; CLO is writeable if BusinessProcess is INPUT, MANADJ, or ALLOC; For all other business process dimensions, CLO is calculated with system calculations. | Consolidated = TRUE; Converted = TRUE; ReversedSign = FALSE |
| CSADD | Addition for shareholder equity | Consolidated = TRUE; Converted = TRUE; ReversedSign = FALSE |
| CSDISP | Disposal for shareholder equity | Consolidated = TRUE; Converted = TRUE; ReversedSign = TRUE |
| DISP | Disposal | Consolidated = TRUE; Converted = TRUE; ReverseSign = TRUE |
| DIVPD | Dividends paid | Consolidated = TRUE; Converted = TRUE; ReversedSign = FALSE |
| ENT | Entrance of a new entity in consolidation scope | Consolidated = TRUE; Converted TRUE; ReversedSign = FALSE |
| EXIT | Exit at the beginning of the fiscal year | Consolidated = TRUE; Converted = TRUE; ReversedSign = FALSE |

-continued

| Flow type | Description | Associated rule properties |
|---|---|---|
| EXTPER | Exit during the current period | Consolidated TRUE;<br>Converted = TRUE;<br>ReversedSign = FALSE |
| FX | Exchange rate variation | Consolidated = TRUE;<br>Converted = TRUE;<br>ReversedSign = FALSE |
| FXF | Current flow exchange rate difference | Consolidated = TRUE;<br>Converted = TRUE;<br>ReversedSign = FALSE |
| FXO | Opening exchange rate difference | Consolidated = TRUE;<br>Converted = TRUE;<br>ReversedSign = FALSE |
| GAP | Discrepancies between opening and other flows | Consolidated = FALSE;<br>Converted = FALSE;<br>ReversedSign = FALSE |
| INT | Inter-company balancing flow | Consolidated = TRUE;<br>Converted = TRUE;<br>ReversedSign = FALSE |
| MER | Merger | Consolidated = TRUE;<br>Converted = TRUE;<br>ReversedSign = FALSE |
| MVT | Movement; Discrepancies between opening and other flows; MVT = CLO − (Signed sum of other flow members) | Consolidated = FALSE<br>Converted = FALSE;<br>ReversedSign = FALSE |
| NETINC | Net income for current period | Consolidated = TRUE;<br>Converted = TRUE;<br>ReversedSign = FALSE |
| NONE | No member | Consolidated = FALSE;<br>Converted FALSE;<br>ReversedSign = FALSE |
| OPE | Opening balance; CLO for the previous period is copied to OPE for the current period. | Consolidated = TRUE;<br>Converted = TRUE;<br>ReversedSign = FALSE |
| PROV | Provisions | Consolidated = TRUE;<br>Converted = TRUE;<br>ReversedSign = TRUE |
| PYA | Prior year adjustment | Consolidated = TRUE;<br>Converted = TRUE;<br>ReversedSign = FALSE |
| REC | Transfer reclassification | Consolidated = TRUE;<br>Converted = TRUE;<br>ReversedSign = FALSE |
| TRN | Transfers | Consolidated = TRUE;<br>Converted = TRUE;<br>ReversedSign = FALSE |

Custom properties include: Carry Forward; Consolidated—used to determine if this flow should be included in the Biz# consolidation rules; Converted—used to determine if this flow should be included in the Biz# currency translation rules; FlowTypeMemberID—used to classify the flow for use with the Biz# financial intelligence features; and ReverseSign—a True/False value that determines whether the sign should be automatically flipped when displaying a value for this flow.

In one embodiment, a Holding dimension can be added that works like the Intercompany dimension for keeping track of holdings between legal entities.

The Intercompany dimension is a system-maintained dimension consisting of only those entities involved in inter-company transactions with other entities in the system. A member from the entity dimension is automatically copied into this dimension when the user sets 'Intercompany' member property to 'True'. Similarly, it is removed if the inter-company member property is set to 'False'.

The Scenario dimension can be included in a model when there is a need to differentiate between data for different modeling scenarios. For instance, this dimension can be included if a modeler wanted to track Budget, Actual, and Forecasted values for any given period of time.

In one implementation, system-defined scenario dimension members can be employed. The following table describes exemplary system-defined dimension members which could be unique to the Scenario dimension.

| Label | Description |
|---|---|
| Actual | Actual Results |
| LRF | Long Range Forecast (5 year) |
| Forecast | Forecast |
| Budget | Annual budget |
| Plan | Plan |
| Annual Estimate | Total for fiscal year (actual + forecast) |
| Variance | Difference between scenarios |
| NONE | No member |

The Time dimension, also known as the Application Calendar, is a system dimension for maintaining a common time scale within an application. This dimension can be automatically included with every model. This dimension is populated and maintained by an Application Calendar wizard.

The Time dimension typically contains thousands of members, depending on the range and granularity (quarter, month, day, and so on) defined for the calendar. Each individual time hierarchy is created as a member view. The Application Calendar wizard generates member properties for Time dimension members. The properties describe the structure of the calendar. For example, the wizard generates properties such as Fiscal Year, Month Label, and WEEK_DAY.

The custom properties for the time Dimension/Application calendar are used by the system to discover the intended structure of the members. Each individual time hierarchy is created as a member view.

Unlike other dimensions that the system generates for a newly created application, a Time Data View dimension can be generated for each model that is created. The Time Data View dimension contains summary values for specified periods, such as YTD (year-to-date), and a cumulative summary, To-date, for each account. The periodic view of an account gives the incremental numbers of the period for the account; the cumulative view gives the sum of all previous periods for the account.

The User dimension is used to maintain the reviewer and approver hierarchies used in workflow. The predefined User dimension maintains user-related information such as workflow reviewer, approver hierarchies, and business roles. Users can be added and maintained in the roles workspace.

When a planning, budgeting and forecasting (PBF) model is created a version dimension can be created that is custom to that model.

Figure 6:
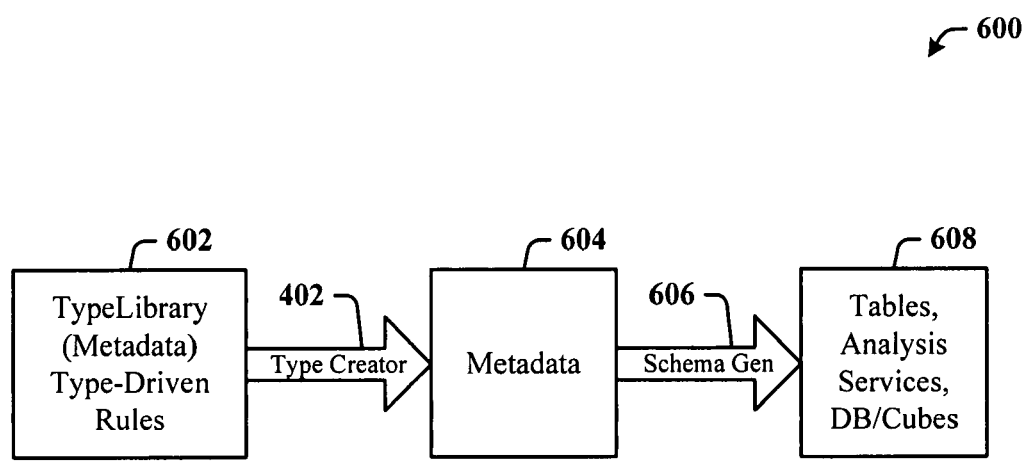
FIG. 6 illustrates a system that utilizes type-driven rules for financial intelligence.

FIG. 6 illustrates a generalized system 600 that utilizes type-driven rules and/or metadata for financial intelligence. The system 600 utilizes the Type Library rules 602 to produce metadata 604 via the type creator 402 and which is thereafter, processed by a separate engine (e.g., a schema engine 606) to produce a physical schema 608 (of tables, analysis services, database and data cubes).

The Type Creator 402 can use a standard depth-first tree traversal of the rules of the Type Library 602 to produce the metadata 604. Following is an exemplary illustration of code for SQL tables used to hold the Type Library metadata rules.

```
-- List of Metadata Types
CREATE TABLE BizTypes (
    -- ID of this Type
    BizTypeID        uniqueidentifier NOT NULL CONSTRAINT NEWID1119 DEFAULT newid( ),
    -- Name of the Type
    BizTypeName      nvarchar(50) NOT NULL,
    -- Short description of the Type
    BizTypeShortDesc nvarchar(256) NULL,
    -- Long description of the Type
    BizTypeLongDesc  nvarchar (2000) NULL,
    -- Types are organized in a hierarchy. This points to the parent Type
    ParentBizTypeID  uniqueidentifier NULL,
    -- Used to hold extended information about this Type
    ExtendedDataXml  xml NULL,
    CONSTRAINT XPKBizTypes PRIMARY KEY (BizTypeID ASC),
    CONSTRAINT FK1_BizTypes_BizTypes FOREIGN KEY (ParentBizTypeID) REFERENCES BizTypes (BizTypeID)
)
```

Following is a list of Type Library rules that apply to each metadata type.

```
-- List of TypeLibrary Rules that apply to each Metadata Type
CREATE TABLE BizTypeItems (
    -- ID of the Type this Rule applies to
    BizTypeID        uniqueidentifier NOT NULL,
    -- ID of this Rule
    BizTypeItemID    uniqueidentifier NOT NULL CONSTRAINT NEWID1182 DEFAULT newid( ),
    -- Name of the Rule
    BizTypeItemName  nvarchar(50) NOT NULL,
    -- Short description of the Rule
    BizTypeItemShortDesc nvarchar(256) NULL,
    -- Long description of the Rule
    BizTypeItemLongDesc  nvarchar(2000) NULL,
    -- Describes the Type of this rule
    RuleTypeID       uniqueidentifier NOT NULL,
    -- Used to control order of Rule interpretation
    RuleOrder        int NULL,
    -- Describes the degree of requiredness for this attribute (eg. Required, NotAllowed, Optional, etc)
    IsRequired       tinyint NOT NULL,
    -- When this Rule is used to create new metadata instances, this is the label of the new instance
    InstanceLabel    nvarchar(50) NULL,
    -- This is the Type of the instance to be created
    InstanceBizTypeID uniqueidentifier NULL,
    -- The newly created instance might refer to another type, this is the type it should refer to
    LinkedBizTypeID  uniqueidentifier NULL,
    -- For metadata that becomes a physical column, this is the data type of that column
    DataType         nvarchar(64) NULL,
    -- For metadata that becomes a physical column, this is the default value of that column
    DefaultValue     sql_variant NULL,
    -- Used to hold extended information about this Rule
    ExtendedDataXml  xml NULL,
    CONSTRAINT XPKBizTypeItems PRIMARY KEY (BizTypeItemID ASC),
    CONSTRAINT FK4_BizTypes_BizTypeItems FOREIGN KEY (LinkedBizTypeID) REFERENCES BizTypes (BizTypeID),
    CONSTRAINT FK3_BizTypes_BizTypeItems FOREIGN KEY (BizTypeID) REFERENCES BizTypes (BizTypeID),
    CONSTRAINT FK2_BizTypes_BizTypeItems FOREIGN KEY (InstanceBizTypeID) REFERENCES BizTypes (BizTypeID),
    CONSTRAINT FK1_BizTypes_BizTypesItems FOREIGN KEY (RuleTypeID) REFERENCES BizTypes (BizTypeID)
)
go
```

The financial types described above with respect to predefined dimensions, for example, represent type-driven financial behavior. In one implementation, the financial types are stored in SQL tables. For example, following is an exemplary description of the Account types table:

```
CREATE TABLE AG_AccountType (
    MemberID         bigint NOT NULL,
    Label            nvarchar(40) NULL CONSTRAINT CHK_Label_AG_AcctType CHECK (Label <> N'ALL'),
    Name             nvarchar(256) NULL,
    Description      nvarchar(256) NULL,
    AccountClassificationMemberId bigint NOT NULL,
    Consolidated     bit NULL,
    Converted        bit NULL,
    DebitCreditMemberId bigint NOT NULL,
    Intercompany     bit NULL,
    TimeBalanceMemberId bigint NOT NULL,
    CreateDatetime   datetime NOT NULL,
    ChangeDatetime   datetime NOT NULL,
    LoadingControlID bigint NULL,
    OwnerId          bigint NULL,
    SequenceNumber   bigint NULL,
    CONSTRAINT XPKAG_AccountType PRIMARY KEY (MemberID ASC)
    ,   CONSTRAINT FK2_DebitCredit_AG_AccountType FOREIGN KEY (DebitCreditMemberID) REFERENCES AG_DebitCredit (MemberID)
    ,   CONSTRAINT FK3_TimeBalance_AG_AccountType FOREIGN KEY (TimeBalanceMemberID) REFERENCES AG_TimeBalance (MemberID)
```

-continued

```
    , CONSTRAINT FK4__AccountClassification__AG__AccountType
FOREIGN KEY (AccountClassificationMemberID) REFERENCES
AG__AccountClassification (MemberID)
)
```

A dimension can take on Account financial behaviors by referring to the Account Type table. In this example, the Account dimension table is defined, as follows:

```
CREATE TABLE D__Account (
    MemberId                bigint NOT NULL,
    -- This column refers to the AG__AccountType table which
defines financial behavior for each Account
    AccountTypeMemberID     bigint NOT NULL,
    Label                   nvarchar(40) NOT NULL CONSTRAINT
CHK__Label__Account CHECK (Label <> N'ALL'),
    Name                    nvarchar(256) NOT NULL,
    Description             nvarchar(512) NULL,
    CONSTRAINT XPKD__Account
            PRIMARY KEY (MemberId ASC),
    CONSTRAINT FK__Account__AG__AccountType
        FOREIGN KEY (AccountTypeMemberID)
            REFERENCES AG__AccountType (MemberID)
)
```

Figure 7:
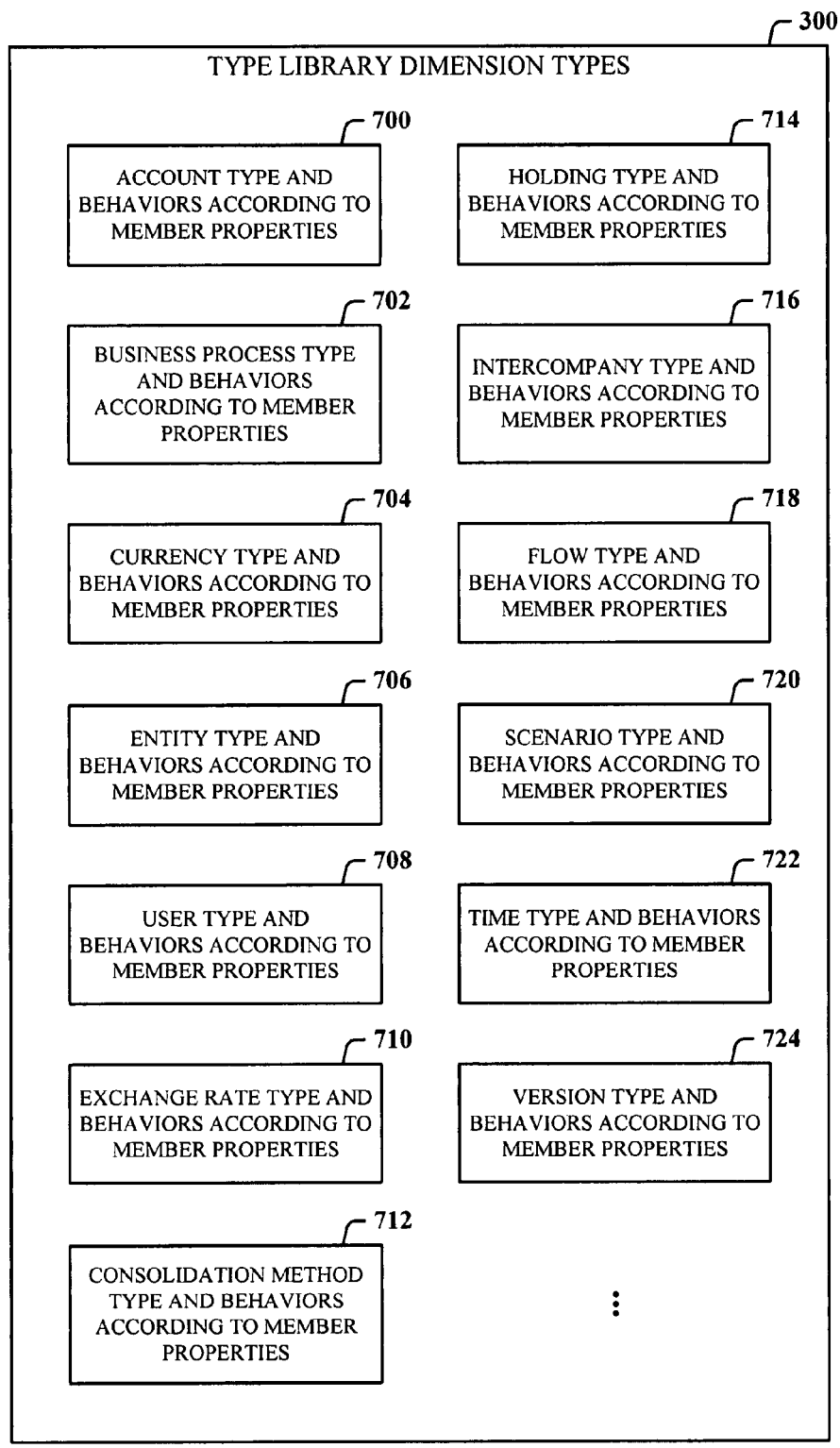
FIG. 7 illustrates an exemplary list of dimension types that can be employed in the type library for a financial intelligence type-driven system.

FIG. 7 illustrates an exemplary list of dimension types that can be employed in the type library 300 for a financial intelligence type-driven system. The type library 300 can include one or more of the dimension types described supra, as well as other types not shown here. Moreover, the member properties of each of the dimension types define the behavior(s) experienced by the runtime applications and/or models created in accordance with the type-driven rules. Accordingly, dimension types and the behaviors associated with the member properties include the following: account 700, business process 702, currency 704, entity 706, user 708, exchange rate 710, consolidation method 712, holding 714, intercompany 716, flow 718, scenario 720, time 722, and version 724.

Figure 8:
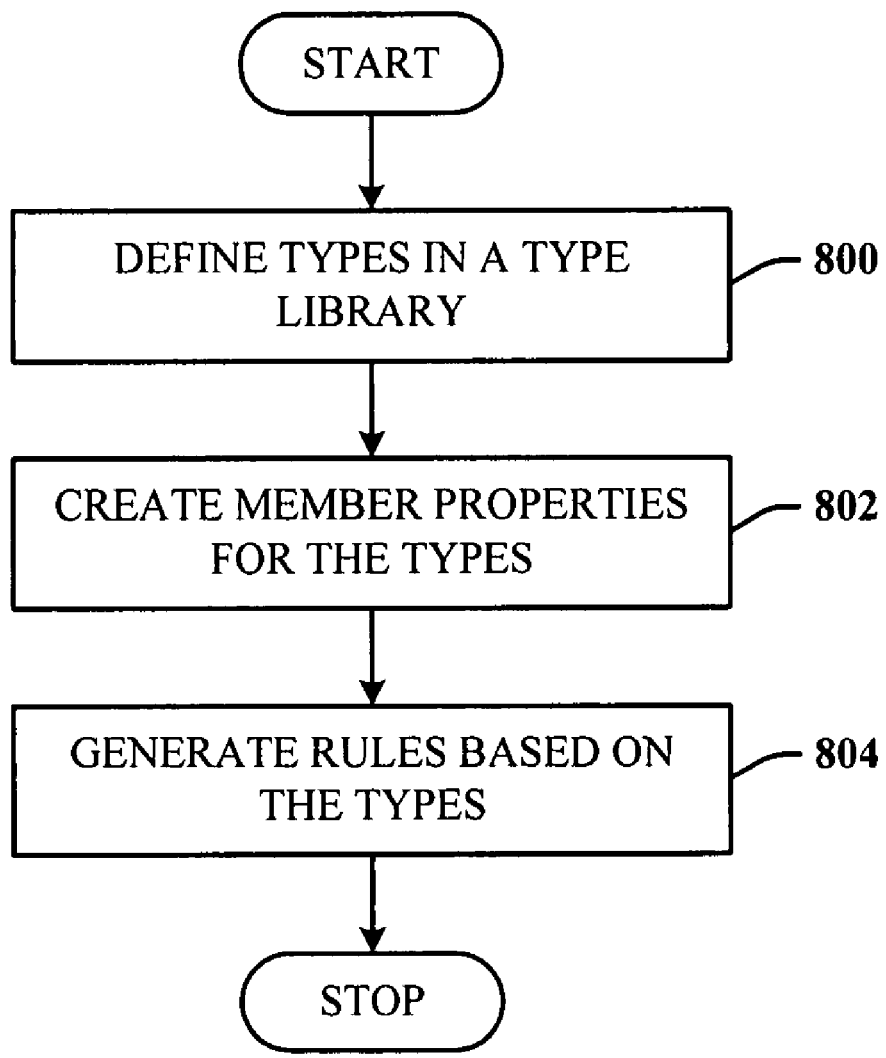
FIG. 8 illustrates a method of managing data in accordance with the type-driven rules of the disclosed financial intelligence system.

FIG. 8 illustrates a method of managing data in accordance with the type-driven rules of the disclosed financial intelligence system. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology.

At 800, types are defined in a type library for use in a financial intelligence system. At 802, member properties are created for the types, the member properties associated with behaviors for the types. At 804, rules are generated based on the types.

Figure 9:
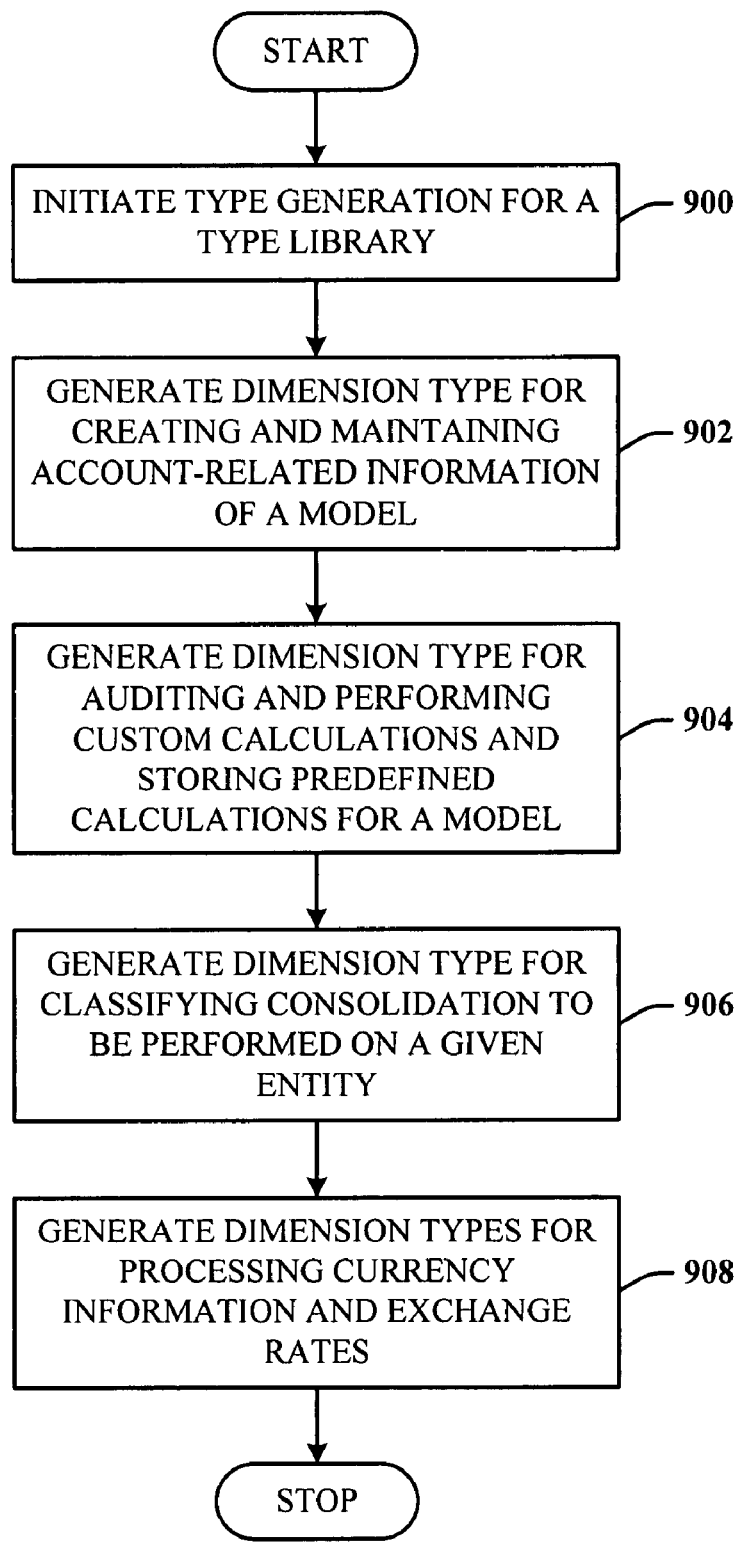
FIG. 9 illustrates a method of defining financial intelligence based on dimension types.

FIG. 9 illustrates a method of defining financial intelligence based on dimension types. At 900, type generation is initiated. At 902, a dimension type is generated for creating and maintaining account-related information of a model. At 904, a dimension type is generated for auditing and performing custom calculations, and storing redefined calculations for a model. At 906, a dimension type is generated for classifying consolidation to be performed on a given entity. At 908, dimension types are generated for processing currency information and exchange rates.

Figure 10:
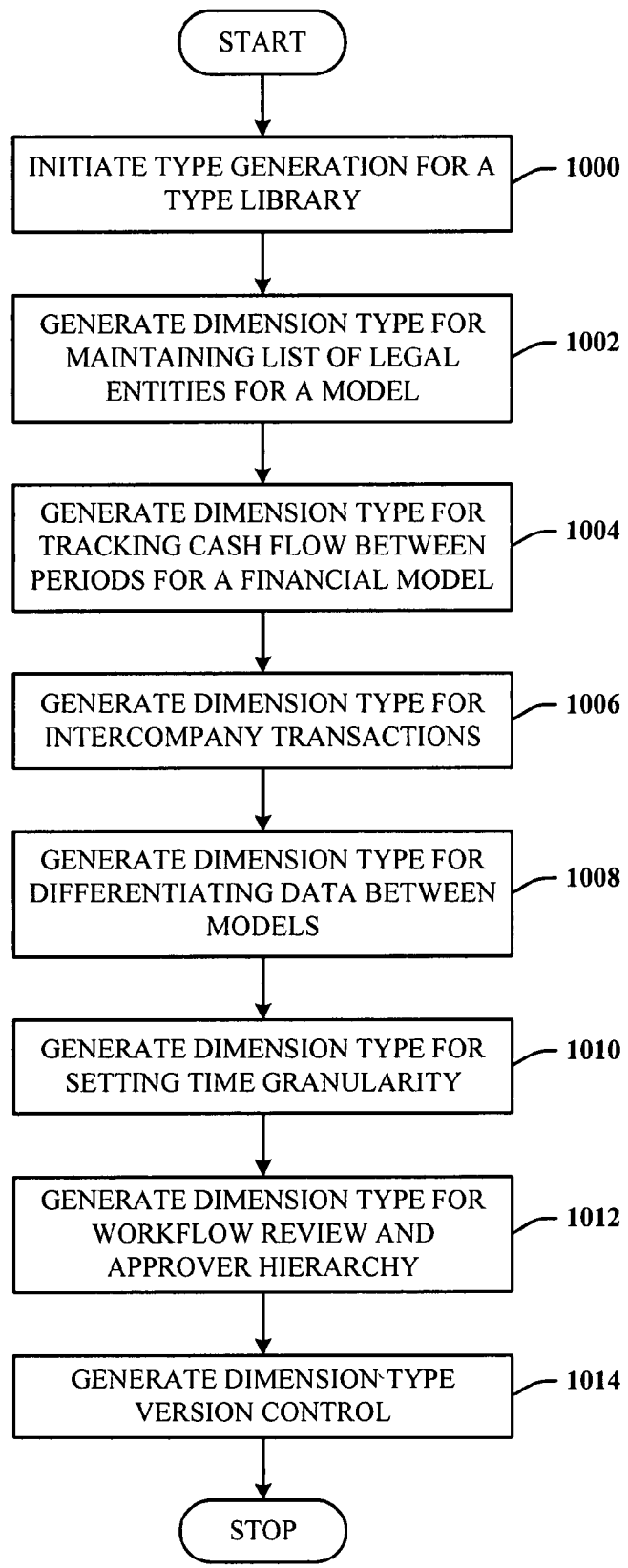
FIG. 10 illustrates a method of defining financial intelligence based on further dimension types.

FIG. 10 illustrates a method of defining financial intelligence based on further dimension types. At 1000, type generation is initiated. At 1002, a dimension type is generated for maintaining a list of legal entities for a model. At 1004, a dimension type is generated for tracking cash flow between periods of time for a financial model. At 1006, a dimension type is generated for intercompany transactions. At 1008, a dimension type is generated for differentiating data between models. At 1010, a dimension type is generated for setting time granularity. At 1012, a dimension type is generated for workflow review and approver hierarchy. At 1014, a dimension type is generated for version control.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
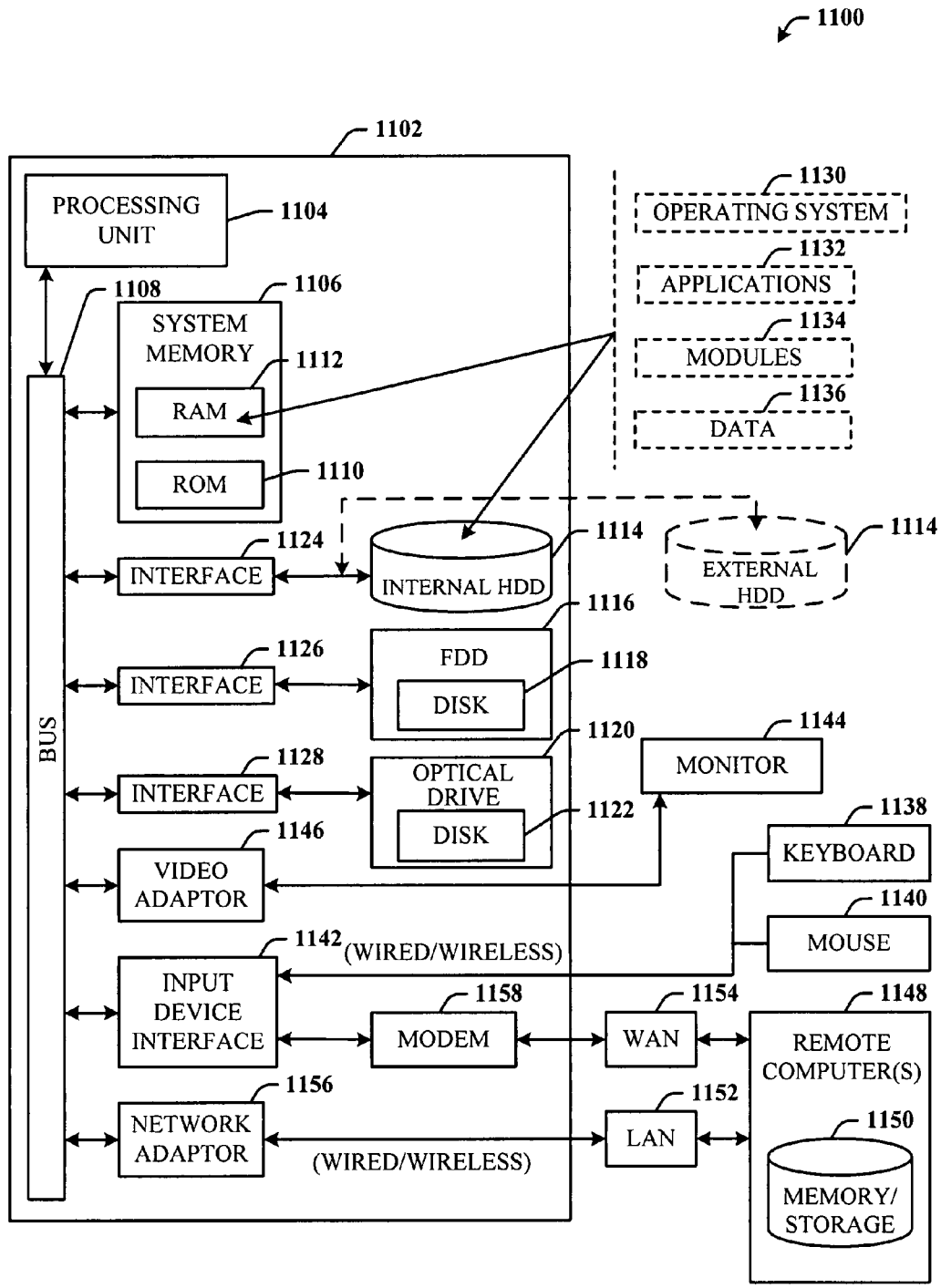
FIG. 11 illustrates a block diagram of a computing system operable to execute the disclosed type-driven rules architecture.

Referring now to FIG. 11, there is illustrated a block diagram of a computing system 1100 operable to execute the disclosed type-driven rules architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that the novel architecture also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102, the computer 1102 including a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the novel architecture can be implemented with various commercially available operating systems or combinations of operating systems.

The modules 1134 can include the type library of types and rules, and the tables; database and cubes can be part of the data 1136.

A user can enter commands and information into the computer 1102 through one or more wired/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 12:
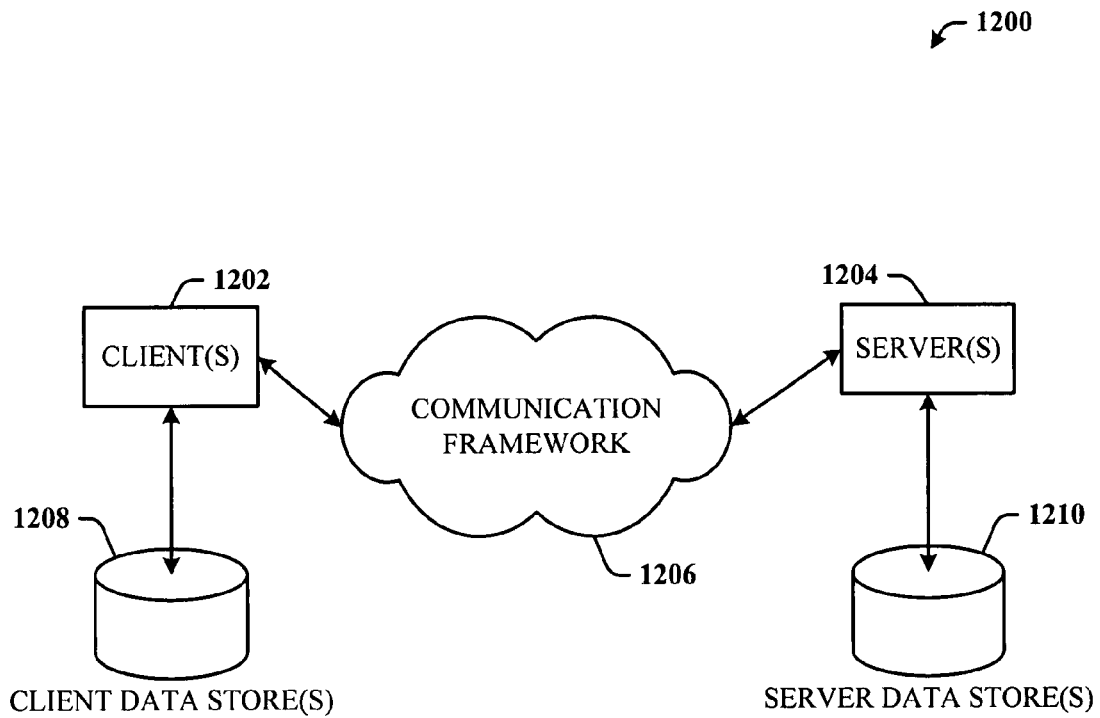
FIG. 12 illustrates a schematic block diagram of an exemplary computing environment that facilitates client access for financial intelligence processing.

Referring now to FIG. 12, there is illustrated a schematic block diagram of an exemplary computing environment 1200 that facilitates client access for financial intelligence processing. The system 1200 includes one or more client(s) 1202. The client(s) 1202 can be hardware and/or software (e.g., threads, processes, computing devices). The client(s) 1202 can house cookie(s) and/or associated contextual information by employing the novel architecture, for example.

The system 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the clients(s) 1202 (e.g., cookie(s) and/or associated contextual information). Similarly, the server(s) 1204 are operatively connected to one or more server data store(s) 1210 that can be employed to store information local to the servers 1204. The servers 1204 can employ the financial intelligence system 100, for example, and/or the applications with business or financial intelligence 212.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates data management, comprising:
    at least one processor;
    a type component of a financial intelligence system that executes on the at least one processor to create and assign types to system entities, the types associated with behaviors defined by member properties;
    a rules component that executes on the at least one processor to generate rules based on the types;
    a type content component that executes on the at least one processor to store the rules as a hierarchy of classes, the hierarchy of classes including a tree of application types and, for each application type in the tree, a set of rules associated with the application type;
    a type creator component that performs a depth-first traversal of the rules of at least one application type in the tree of application types to create an instance of the at least one application type; and
    a runtime engine that executes on the at least one processor to generate an application that employs the behaviors based on execution of the rules associated with the instance of the at least one application type.

2. The system of claim 1, wherein the types include financial and business types.

3. The system of claim 1, wherein the runtime engine also generates a model that employs the behaviors based on execution of the rules associated with the instance of the at least one application type.

4. The system of claim 1, wherein the types include a structural type for creating a model.

5. The system of claim 1, wherein the type component includes predefined model structures.

6. The system of claim 1, further comprising a type validator component for validating that metadata of a database or application is complete and valid.

7. The system of claim 1, further comprising a type constraint checker for checking that the rules are valid for a given model.

8. A computer-implemented method of managing data, comprising:
    defining types as a type library for use in a financial intelligence system;
    creating member properties for the types, the member properties associated with behaviors for the types;
    generating rules based on the types;
    storing the rules as a hierarchy of classes, the hierarchy of classes including a tree of application types and, for each application type in the tree, a set of rules associated with the application type;
    performing a depth-first traversal of the rules of at least one application type in the tree of application types to create an instance of the at least one application type; and
    generating an application that employs the behaviors based on execution of the rules associated with the instance of the at least one application type;
    wherein the defining, creating, storing, performing and generating steps are performed by a computer.

9. The method of claim 8, further comprising processing rules related to structure to generate a data model for sharing with other sets of data.

10. The method of claim 8, further comprising generating a type for creating and maintaining account-related information for a financial model.

11. The method of claim 8, further comprising generating a type for auditing and performing custom calculations, and storing predefined calculations for a financial model.

12. The method of claim 8, further comprising generating a type for classifying consolidation to be performed on a given entity.

13. The method of claim 8, further comprising generating types for processing currency information and currency exchange rates.

14. The method of claim 8, further comprising generating a type for maintaining a list of legal entities for a model.

15. The method of claim 8, further comprising generating a type for tracking cash flow between periods for a financial model and a type for intercompany transactions.

16. The method of claim 8, further comprising generating a type for differentiating data between models.

17. The method of claim 8, further comprising generating a type for setting time granularity and a type for workflow review and approver hierarchy.

* * * * *